Nov. 26, 1963 F. J. SCHRAMEL ETAL 3,112,363

DEVICE TO SHIFT A BLOCK SIGNAL TO A GIVEN MEAN PHASE AND TO HOLD IT THEREIN WITH RESPECT TO THE PULSE INSTANTS OF AN INCOMING PULSE SEQUENCE

Filed Feb. 14, 1961 6 Sheets-Sheet 1

INVENTOR
FRANZ J. SCHRAMEL
CHARLES G. DEN HERTOG
BY WILHELM F. BROK
Frank R. Jeifari
AGENT

INVENTOR
FRANZ J. SCHRAMEL
CHARLES G. DEN HERTOG
BY WILHELM F. BROK
AGENT

INVENTOR
FRANZ J. SCHRAMEL
CHARLES G. DEN HERTOG
BY WILHELM F. BROK
Frank R. Jifari
AGENT INVENTOR
FRANZ J. SCHRAMEL
CHARLES G. DEN HARTOG
BY WILHELM F. BROK
Frank R. Jeifari
AGENT INVENTOR
FRANZ J. SCHRAMEL
CHARLES G. DEN HERTOG
BY WILHELM F. BROK
Frank R. Trifari
AGENT DEVICE TO SHIFT A BLOCK SIGNAL TO A GIVEN MEAN PHASE AND TO HOLD IT THEREIN WITH RESPECT TO THE PULSE INSTANTS OF AN INCOMING PULSE SEQUENCE Filed Feb. 14, 1961 6 Sheets-Sheet 6

| | |
|---|---|
| + 0 | 1 1 1 1 1 1 |
| + 1 | 0 1 1 1 1 1 |
| + 2 | 1 0 1 1 1 1 |
| + 3 | 0 0 1 1 1 1 |
| + 4 | 1 1 0 1 1 1 |
| + 5 | 0 1 0 1 1 1 |
| + 6 | 1 0 0 1 1 1 |
| + 7 | 0 0 0 1 1 1 |
| + 8 | 1 1 1 0 1 1 |
| + 9 | 0 1 1 0 1 1 |
| +10 | 1 0 1 0 1 1 |
| +11 | 0 0 1 0 1 1 |
| +12 | 1 1 0 0 1 1 |
| +13 | 0 1 0 0 1 1 |
| +14 | 1 0 0 0 1 1 |
| +15 | 0 0 0 0 1 1 |
| +16 | 1 1 1 1 0 1 |
| +17 | 0 1 1 1 0 1 |
| +18 | 1 0 1 1 0 1 |
| +19 | 0 0 1 1 0 1 |
| +20 | 1 1 0 1 0 1 |
| +21 | 0 1 0 1 0 1 |
| +22 | 1 0 0 1 0 1 |
| +23 | 0 0 0 1 0 1 |
| +24 | 1 1 1 0 0 1 |
| +25 | 0 1 1 0 0 1 |
| +26 | 1 0 1 0 0 1 |
| +27 | 0 0 1 0 0 1 |
| +28 | 1 1 0 0 0 1 |
| +29 | 0 1 0 0 0 1 |
| +30 | 1 0 0 0 0 1 |
| +31 | 0 0 0 0 0 1 |
| + 0 | 1 1 1 1 1 1 → h |

FIG. 8

| | |
|---|---|
| -0 | 0 0 0 0 0 0 |
| -1 | 1 0 0 0 0 0 |
| -2 | 0 1 0 0 0 0 |
| -3 | 1 1 0 0 0 0 |
| -4 | 0 0 1 0 0 0 |
| -5 | 1 0 1 0 0 0 |
| -6 | 0 1 1 0 0 0 |
| -7 | 1 1 1 0 0 0 |
| -8 | 0 0 0 1 0 0 |
| -9 | 1 0 0 1 0 0 |
| -10 | 0 1 0 1 0 0 |
| -11 | 1 1 0 1 0 0 |
| -12 | 0 0 1 1 0 0 |
| -13 | 1 0 1 1 0 0 |
| -14 | 0 1 1 1 0 0 |
| -15 | 1 1 1 1 0 0 |
| -16 | 0 0 0 0 1 0 |
| -17 | 1 0 0 0 1 0 |
| -18 | 0 1 0 0 1 0 |
| -19 | 1 1 0 0 1 0 |
| -20 | 0 0 1 0 1 0 |
| -21 | 1 0 1 0 1 0 |
| -22 | 0 1 1 0 1 0 |
| -23 | 1 1 1 0 1 0 |
| -24 | 0 0 0 1 1 0 |
| -25 | 1 0 0 1 1 0 |
| -26 | 0 1 0 1 1 0 |
| -27 | 1 1 0 1 1 0 |
| -28 | 0 0 1 1 1 0 |
| -29 | 1 0 1 1 1 0 |
| -30 | 0 1 1 1 1 0 |
| -31 | 1 1 1 1 1 0 |
| - 0 | 0 0 0 0 0 0 → i |

FIG. 9

| | | |
|---|---|---|
| | -0 | 0 0 0 0 0 0 |
| ↓ | -1 | 1 0 0 0 0 0 |
| | -2 | 0 1 0 0 0 0 |
| | -3 | 1 1 0 0 0 0 |
| ↑ | -2 | 0 1 0 0 0 0 |
| | -1 | 1 0 0 0 0 0 |
| | -0 | 0 0 0 0 0 0 |
| | +0 | 1 1 1 1 1 1 |
| | +1 | 0 1 1 1 1 1 |
| | +2 | 1 0 1 1 1 1 |
| ↓ | +1 | 0 1 1 1 1 1 |
| | +0 | 1 1 1 1 1 1 |
| | -0 | 0 0 0 0 0 0 |
| ↑ | +0 | 1 1 1 1 1 1 |
| | +1 | 0 1 1 1 1 1 |
| | +2 | 1 0 1 1 1 1 |
| | +3 | 0 0 1 1 1 1 |
| | +4 | 1 1 0 1 1 1 |
| | +5 | 0 1 0 1 1 1 |
| ↓ | +4 | 1 1 0 1 1 1 |
| | +3 | 0 0 1 1 1 1 |
| | +2 | 1 0 1 1 1 1 |
| ↑ | +3 | 0 0 1 1 1 1 |
| | +4 | 1 1 0 1 1 1 |
| | +5 | 0 1 0 1 1 1 |
| | +6 | 1 0 0 1 1 1 |
| | +7 | 0 0 0 1 1 1 |
| | +8 | 1 1 1 0 1 1 |
| | ...... | ...... |
| | ...... | ...... |
| | ...... | ...... |
| | ...... | ...... |
| | ...... | ...... |
| | ...... | ...... |
| ↑ | +24 | 1 1 1 0 0 1 |
| | +25 | 0 1 1 0 0 1 |
| | +26 | 1 0 1 0 0 1 |
| | +27 | 0 0 1 0 0 1 |
| | +28 | 1 1 0 0 0 1 |
| | +29 | 0 1 0 0 0 1 |
| ↓ | +28 | 1 1 0 0 0 1 |
| | +27 | 0 0 1 0 0 1 |
| | +26 | 1 0 1 0 0 1 |
| ↑ | +27 | 0 0 1 0 0 1 |
| | +28 | 1 1 0 0 0 1 |
| | +29 | 0 1 0 0 0 1 |
| | +30 | 1 0 0 0 0 1 |
| | +31 | 0 0 0 0 0 1 |
| | + 0 | 1 1 1 1 1 1 → h |

FIG. 10

INVENTORS
FRANZ J. SCHRAMEL
CHARLES G. DEN HERTOG
WILHELM F. BROK
BY
Frank R. Trifari
AGENT.

3,112,363

DEVICE TO SHIFT A BLOCK SIGNAL TO A GIVEN MEAN PHASE AND TO HOLD IT THEREIN WITH RESPECT TO THE PULSE INSTANTS OF AN INCOMING PULSE SEQUENCE

Franz Josef Schramel and Charles Govert Den Hertog, Hilversum, and Wilhelm Fredrik Brok, Voorburg, Netherlands, assignors to North American Philips Company, Inc., New York, N.Y., a corporation of Delaware Filed Feb. 14, 1961, Ser. No. 89,140
Claims priority, application Netherlands Feb. 22, 1960
10 Claims. (Cl. 178—53.1)

This invention relates to a device for shifting a block signal to a given mean phase and to hold it therein with respect to the pulse instants of an incoming pulse sequence. The need for such a device is particularly felt in telegraphy. The pulse sequence may then be derived from the incoming telegraph signal so that the pulses correspond to the flanks of the telegraph signal. Such a pulse signal may be derived in known manner from the telegraph signal, for example, by differentiation and rectification. The problem is therein to determine as accurately as possible the centres of the code elements of the telegraph signal, since these centres indicate with the maximum probability the correct values of the code elements, so that it is of practical use to scan the original telegraph signal at the instants concerned. It is obvious that the problem is solved as soon as it is possible to produce a block signal which has, at least on an average, a given fixed phase with respect to the aforesaid pulse sequence. It is not difficult, indeed, to derive from this block signal again a pulse sequence, of which the pulses have a fixed phase position with respect to the said block signal; use is preferably made, to this end of the phase position corresponding to the centres of the telegraph signal. The device according to the invention is characterised in that it comprises a clock pulse generator of which the frequency is a multiple of the mean repetition frequency of the pulses of the incoming pulse sequence, a block-signal generator which is fed by the clock pulse generator and derives from the pulses supplied by the clock pulse generator a block signal synchronized therewith, a counting circuit, to which are fed the pulses of the incoming pulse sequence and the pulses of a pulse sequence supplied by the clock pulse generator which circuit, after the reception of a pulse of the incoming pulse sequence, counts off a fixed number of the pulses supplied by the clock pulse generator and allows them to pass, which number is, however, such that the last of a group of counted-off pulses always occurs prior to the next-following pulse of the incoming pulse sequence, a signal generator, to which both the block signal and the groups of counted-off pulses are fed, which generator is driven by the last-mentioned pulses stepwise either in one direction or in the other direction in accordance with the value of the block signal at the instant when the pulse concerned occurs and which produces a correction pulse of a first kind, when it reaches an extreme position in one direction and produces a correction pulse of a second kind, when it reaches an extreme position in the other direction, this reaching of an extreme position resulting, moreover, in that the signal generator leaps back to a central position or a zero position and in that the correction pulses produced by the signal generator are fed to the block signal generator, which is constructed so that the block pulses of the block signal are advanced by a fixed time interval when it receives a correction pulse of one kind by and are delayed by a fixed time interval when it receives a control pulse of the other kind.

The invention will now be described more fully with reference to the drawing.

FIGS. 8–10 are charts illustrating the states of the components of the circuit of FIG. 7 in response to successive input signals.

Figure 1:
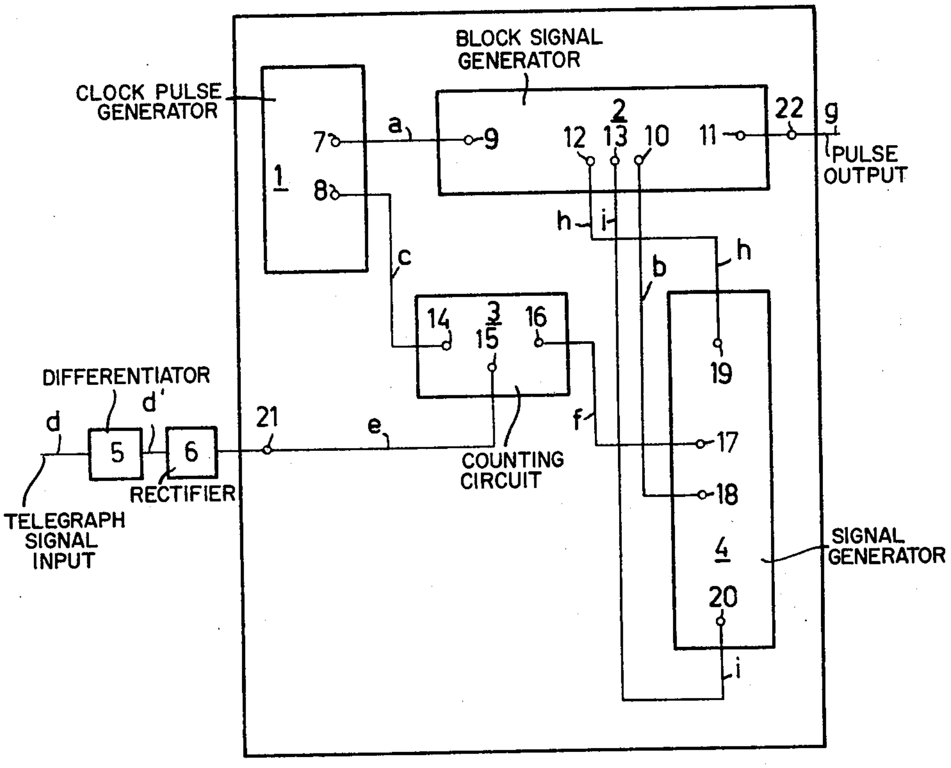
FIG. 1 shows the block diagram of one embodiment of the invention, particularly intended for the preparation of the process to which telegraph signals are to be subjected.
Figure 2:
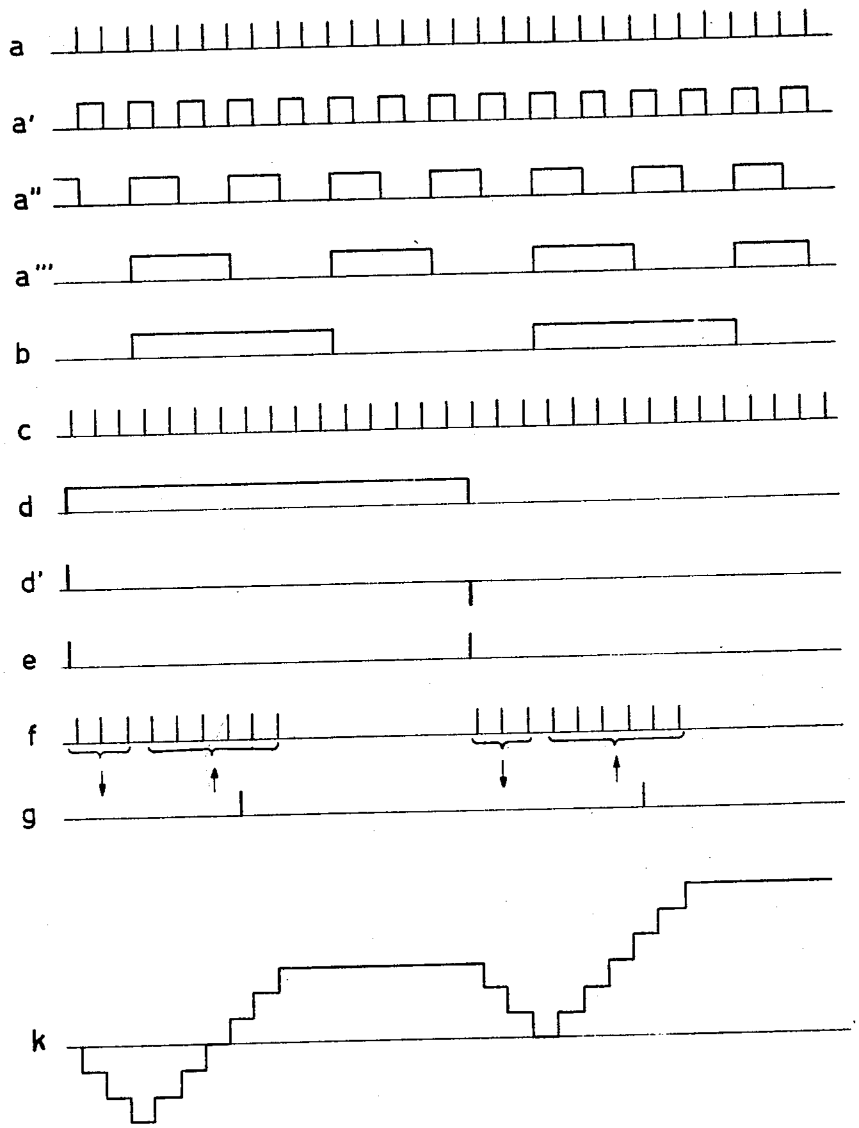
FIG. 2 shows a number of explanatory diagrams.

Referring to FIG. 1, reference numeral 1 designates a stabilized clock pulse generator having two output terminals 7 and 8, both of which supply a sequence of pulses, the pulses supplied by the terminal 7 lying, however, just midway between the pulses supplied by the terminal 8. In FIG. 2 these sequences of pulses are indicated by the graphs *a* and *c*. It is supposed that the repetition frequency of these pulses is such that one signal element of the telegraph signal corresponds, at least on an average, to sixteen pulses, but this number is not essential for the invention.

The block 2 designates a block-signal generator, which receives at its input terminal 9 the pulse sequence *a* and at its output terminal 10 supplies a block signal (signal *b* in FIG. 2). If all is correct, the centres of the blocks coincide with the high signal values coincide with the centres of the telegraph signal, which is represented in FIG. 2 by the graph *d*. The block signal generator 2 comprises furthermore a second output terminal 11, which supplies a sequence of pulses (signal *g* in FIG. 2), of which the pulses lie in the centres of the blocks with a high signal value of the block signal *b*. Consequently, these pulses can be used to indicate the scanning instants of the telegraph signal *d*. The block signal generator 2 may consist of a plurality flip-flops connected in cascade (in this embodiment four), so that from the pulse sequence *a* the block signals *a'*, *a''*, *a'''*, *b* (FIG. 2) can be derived in order of succession.

In order to permit a control, the block signal generator 2 is constructed so that it is possible to advance or to delay the block signal supplied by the output terminal 10 for a given time interval. In this embodiment this time interval is chosen to be the repetition period of the pulse sequences *a* and *c*, but this is not essential. The block signal generator 2 comprises to this end two control-terminals 12 and 13 and is designed so that the block signal *b* is delayed for a repetition period of the pulse sequences *a* and *c*, when a pulse *h* is fed to the terminal 12, and is advanced by the same time interval, when a pulse *i* is fed to the terminal 13. These correction pulses *h* and *i* are produced by the set of members 3 and 4.

The initial telegraph signal *d* (see also FIG. 2) is differentiated in a differentiator 5, so that the signal *d'* (see FIG. 2) is obtained, this last signal being rectified in a rectifying circuit 6, which produces the pulse sequence *e*, which is fed to the input terminal 21 of the device as a whole. The member 3 is a counting circuit having an input terminal 14, which receives the pulse sequence *c* produced by the clock pulse generator 1, a control-terminal 15, which receives the pulse sequence *e* derived from the telegraph signal *d*, and an output terminal 16. The counting circuit 3 is designed so that, after the reception of a pulse of the pulse sequence *e*, it allows a fixed number of pulses (in this embodiment nine) of the pulse sequence *c* to pass to its output terminal 16, after which it closes until the next-following pulse of the pulse sequence *e* is received. This number must at least be equal to two and is allowed to be at the most the mean number of pulses of the pulse sequence *c* corresponding to a signal element minus one. The conditions for obtaining the optimum control will be described more fully hereinafter.

The pulse groups supplied by the counting circuit 3 (signal *f*) are fed to an input terminal 17 and the block signal supplied by the block signal generator 2 (signal *b*) is fed to an input terminal 18 of a signal generator 4. This signal generator is a member which is caused by each pulse fed to its input terminal 17 to perform a step either in one or in the other of two opposite directions. For the sake of simplicity this will hereinafter be termed an upward step and a downward step respectively. Whether a step is performed upwardly or downwardly depends upon the fact whether the potential of the block signal *b* is high or low at the instant of reception of the pulse concerned. The signal generator is furthermore designed so that from a given zero position it can perform only a given number (for example 31) upward or downward steps and after it has reached an extreme position it jumps back into the zero position at the reception of a next-following pulse. If this jump back to the zero position is performed out of the extreme top position, the signal generator 4 supplies by its output terminal 19 a correction pulse *h* (FIG. 1) and if this jump back to the zero position takes place out of the extreme downward position, the signal generator 4 supplies by its output terminal 20 a correction pulse *i*. It may be desirable that none of the pulses fed to the input terminal 17 should occur at the instant when the block signal *b* fed to the input terminal 18 has a transition. In the device shown in FIG. 1 this is achieved by interlacing the pulses of the sequences *a* and *c*, whilst the transitions of the block signal *b* coincide with the pulses of the sequence *a*.

The device operates as follows. It is supposed that the relative positions of the block signal *b* and of the telegraph signal *d* are as shown in FIG. 2. The scanning pulses *g* then do not occur precisely at the centres of the signal elements of the telegraph signal, but slightly sooner, in other words, the control has to provide that the block signal *b* and hence the scanning pulses *g* should be slightly delayed. It appears, however, from FIG. 2 that three pulses of each group of nine pulses supplied by the counting circuit 3 occur at instants when the block signal *b* has a low value and that six of said pulses occur at instants when the block signal *b* has a high value. Consequently, the signal generator 4 will perform three downward steps and six upward steps during each pulse group supplied by the counting circuit 3. This is illustrated diagrammatically by the graph *k* of FIG. 2. The result of these measures is that the signal generator reaches, after some time, its extreme top position and then jumps back into its zero position and at the same time produces a correction pulse *h*. The latter causes a delay of the block signal *b* for a given time interval, which means that it shifts so that the centres of the high parts of the block signal *b* and the elements of the telegraph signal are spaced apart from each other by a smaller distance than before. A similar effect is obtained, when the block signal is shifted to the other side with respect to the telegraph signal.

If the number of pulses of the pulse groups of the signal *f* is even-numbered, the device has two states of equilibrium, of which one is labile and one is stable. If the said number is an odd number, the device has no states of equilibrium and the signal generator 4 thus permanently performs steps either upwardly or downwardly, so that the device oscillates about the state, which would be a stable state of equilibrium, if the said number were even. It is therefore advantageous to take for the said number an odd number, since the device is then prevented from staying in a labile state of equilibrium for a longer or shorter time, whilst, moreover, the deviation from the desired state is smaller than in the case of an even number. It may furthermore be proved that the optimum control is obtained, when the block length of the block signal *b* is rendered equal to half the length of the elements of the telegraph signal *d* and the number of pulses of the pulse groups *f* is chosen so that each pulse group extends over the time of about one block of the block signal *b*. The device according to the invention has the advantage that it does not directly respond to each stated deviation from the desired state, but that it performs a correction only when the sum of successively stated deviations reaches a given value, which means that the device corrects the average of the stated deviations.

The invention is independent of the construction of the component parts of the device of FIG. 1. These parts may be of an electronic, an electric, an electro-mechanical and, if desired, even of a purely mechanical nature, although electronic components will be preferred in most cases. Hereinafter a description of an electronic embodiment of the components is given.

Figure 3:
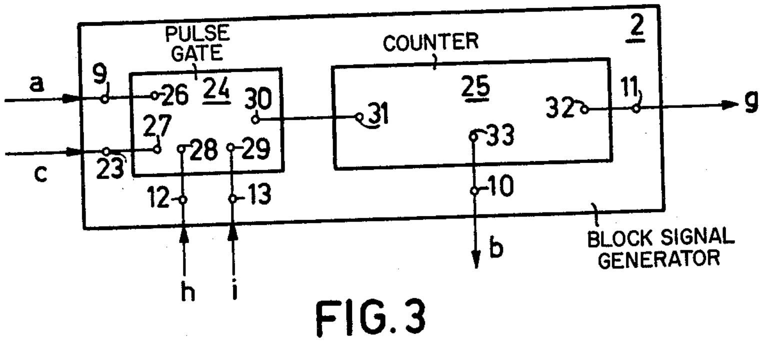
FIGS. 3 to 7 show the diagrams of possible embodiments of component parts of the device shown in FIG. 1.
Figure 4:
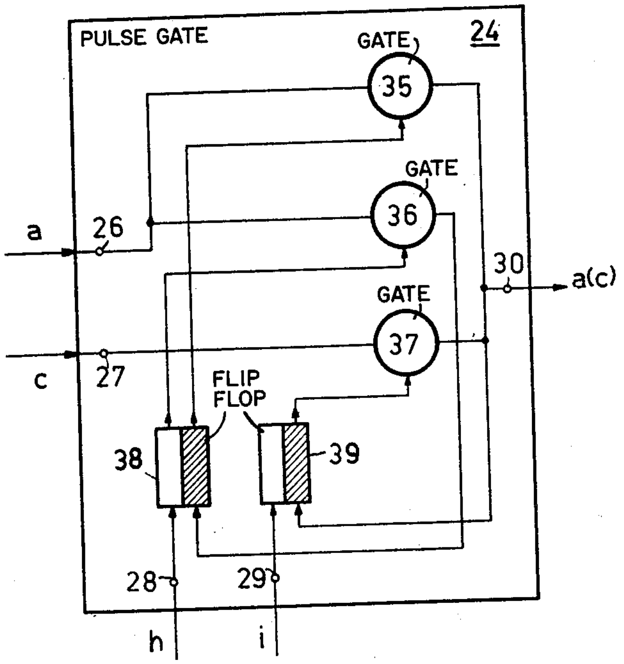
Figure 5:
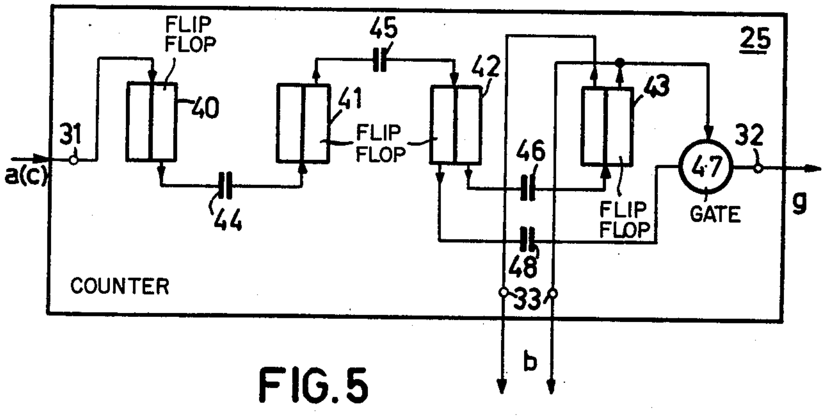

FIG. 3 shows a possible embodiment of the block signal generator 2. It comprises a particular pulse gate 24 and a counting circuit 25 consisting of four flipflops. The pulse gate 24 has two input terminals 26 and 27, two control-terminals 28 and 29 and one output terminal 30. The input terminal 26 receives the pulses of the sequence *a*, the input terminal 27 the pulses of the sequence *c*, the control-terminal 28 the correction pulses *h* and the control-terminal 29 the correction pulses *i*. Normally the pulse gate 24 allows only the pulse sequence *a* fed to its input terminal 26 to pass. However, when a pulse *h* is fed to its control-terminal 28, one of the pulses of the pulse sequence *a* is suppressed, which has a delaying effect on the block signal supplied by the counting circuit 25. When a pulse *i* is fed to the control-terminal 29, a pulse of the pulse sequence *c* is allowed to pass between two successive pulses of the pulse sequence *a*, which has an advancing effect on the block signal *b*, supplied by the counting circuit 25. FIG. 4 shows the principle of a potential embodiment of a pulse gate 24. It comprises three gate circuits 35, 36, 37 and two flipflops 38, 39. Normally the flipflops 38 and 39 have a position such that the gate 35 is open, i.e. allows the pulses of the pulse sequence *a* to pass to the output terminal 30, whereas the gates 36 and 37 are closed, i.e. do not allow the pulses of the pulse sequences *a* and *c* to pass. If the terminal 28 receives a pulse *h*, the flipflop 38 changes over, so that the gate 35 closes and the gate 36 opens. Then the next-following pulse of the pulse sequence *a* cannot reach the output terminal 30 via the gate 35 and thus is suppressed, but it passes through the gate 36, so that the flipflop 38 returns to its normal position. The following pulse of the pulse sequence *a* passes normally through the gate 35. Consequently, just one pulse of the pulse sequence *a* is suppressed. If the terminal 29 receives a pulse *i* the flipflop 39 changes over, so that the gate 37 becomes conductive. The first-following pulse of the pulse sequence *c* reaches via the gate 37 the output terminal 30, but it causes at the same time the flipflop 39 to return. Consequently, just one pulse of the pulse sequence *c* is interlaced between two pulses of the sequence *a*. The counting circuit 25 may be constructed in known manner from four cascade-connected flipflops 40, 41, 42, 43 (FIG. 5), so that the block signals *a'*, *a''*, *a'''*, *b* (FIG. 2) are formed successively. The block signal *b* of which the two polarities are utilized, can be derived from the two halves of the last flipflop 43. The scanning pulses *g* are formed by the criterion that they should coincide with the downward fronts of the blocking signal *a'''*, which occurs at instants, when the block signal *b* has its high value. The signal *g* can thus be derived via a gate 47 from the flipflops 42 and 43.

Figure 6:
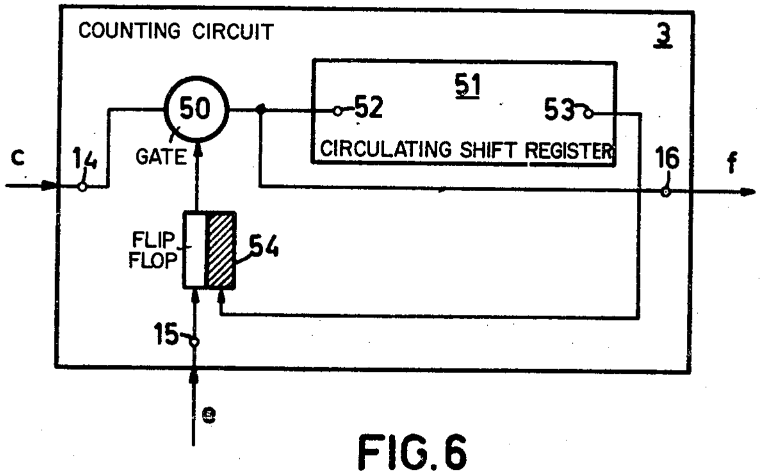

FIG. 6 shows the principle of a potential embodiment of the counting circuit 3. It comprises a gate 50, a circuit 51, which counts off the desired number of pulses and then supplies a pulse, and a flipflop 54. Normally the flipflop 54 occupies the position in which the gate 50 is closed. If the control-terminal 15 receives a pulse of the pulse sequence *e*, it changes over, so that the gate 50 is opened and the pulses of the pulse sequence $c$ are allowed to pass to the input terminal 52 of the circuit 51. As soon as this circuit has counted off a given number of pulses (in this case nine pulses), its output terminal 53 supplies a pulse which causes the flipflop 54 to return and thus to close the gate 50 again. The circuit 51 may, for example, be a circulating shift register, which after the reception of the prescribed number of pulses supplies each time a pulse and then returns to its zero position.

Figure 7:
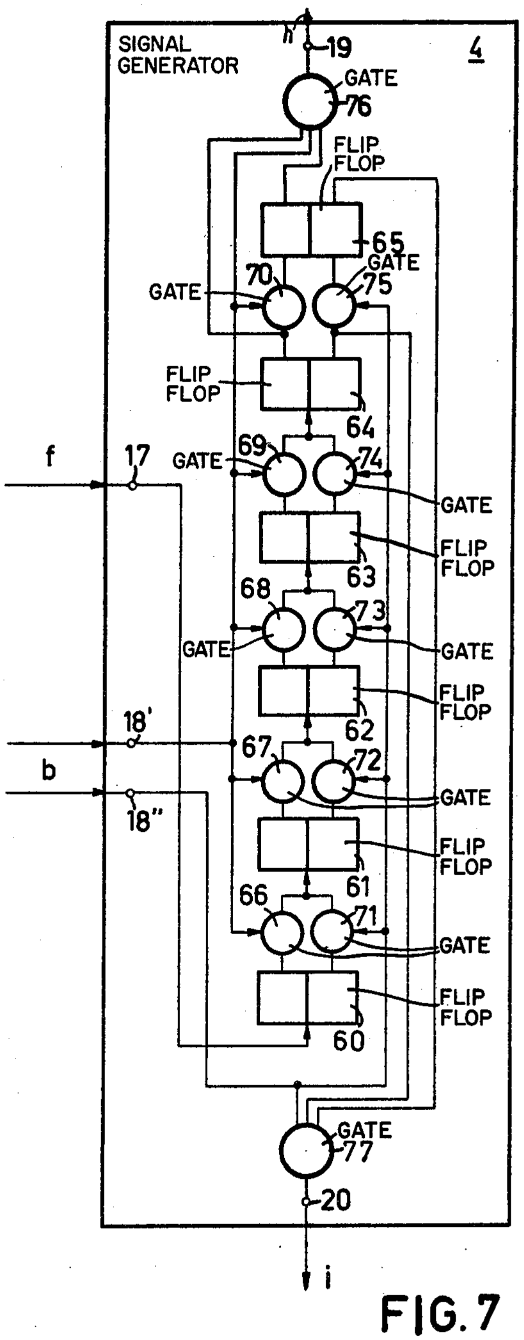

FIG. 7 shows the principle of a potential embodiment of the signal generator 4. It comprises a counting circuit of five cascade-connected flipflops 60, 61, 62, 63, 64, this cascade being capable of counting both forwardly and backwardly, and an additional flipflop 65. The possibility of counting forwardly and backwardly is obtained in known manner by deriving the change-over pulses supplied by the flipflops either from the left-hand halves or to the right-hand halves of the flipflops. This is rendered dependent on the instantaneous value of the block signal $b$ by passing the change-over pulses through gates (66 to 69, 71 to 74 respectively, which are controlled by the block signal $b$. If the block signal $b$ has a high value, the gates 66 to 69 are open and the gates 71 to 75 are closed. If the block signal $b$ has a low value the situation is just the reverse. The position of each flipflop is indicated by the digits 0 and 1, so that the digit 0 indicates that the left-hand half of the flipflop concerned has a low voltage and the digit 1 indicates that this half has a high voltage, if the flipflops 60, 61 . . . 65 occupy the positions $\epsilon_1, \epsilon_2 \ldots \epsilon_6$ ($\epsilon_i$=0 or 1), the position of the signal generator is indicated by the symbol ($\epsilon_1\epsilon_2\epsilon_3\epsilon_4\epsilon_5\epsilon_6$). Thus, for example, the symbol (011001) signifies that the flipflops 60, 61, 62, 63, 64, 65 occupy the positions 0, 1, 1, 0, 0, 1 respectively.

The signal generator has two zero positions, i.e., the position (111111) for moving stepwise in one direction (gates 66, 67 . . . 70 open) and the position (000000) for moving stepwise in the other direction (gates 71, 72 . . . 75 open).

The operation of the signal generator can be described most simply with reference to the diagrams of FIGS. 8, 9 and 10. It is supposed that the signal generator starts from the position (111111), which is indicated in FIG. 8 by +0, whereas the gates 66, 67 . . . 70 are open, the gates 71, 72 . . . 75 are closed. Owing to the reception of the pulses of the signal $f$, the signal generator 4 passes successively through the positions indicated in FIG. 8 by +1, +2 . . . +31, +0. Each of the flipflops 61, 62, 63, 64 changes over, when the preceding flipflop jumps from the position 0 into the position 1. The flipflop 65 remains in the position 1, since the gate 75 is closed, so that no high voltage can be fed to the right-hand half, whereas the gate 70 does not allow the low voltage that is supplied by the left-hand half of the flipflop 64 from the position +16 on, to pass. However, when the signal generator 4 jumps from the position +31 into the position +0, the flipflop 64 supplies a pulse, which passes through the gate 76, since the flipflop 65 then occupies the position 1 and the signal $b$ has its high value. The signal generator has then supplied a correction pulse $h$.

FIG. 9 shows in a similar manner which positions the signal generator passes through out when starting from the position (000000) (indicated in FIG. 9 by −0), the gates 71, 72 . . . 75 being open. Each of the flipflops 61, 62, 63, 64 changes over, when the preceding flipflops jumps from position 1 into the position 0. The flipflop 65 remains in the position 0, since the gate 70 is closed, so that no high voltage is fed to the left-hand half of the flipflop 65, whereas the gate 75 does not allow to pass the low voltage supplied by the right-hand half of the flipflop 64 from the position −16. When the signal generator jumps from the position −31 into the position −0, the flipflop 64 supplies a pulse, which passes through the gate 77, since the flipflop 65 then occupies the position 0 and the signal $b$ has its low value. The signal generator has thus supplied a correction pulse $i$.

FIG. 10 illustrates the process evolving when the signal generator starts from the position −0 and receives each time three pulses at a low value of the signal $b$ (gates 71, 72 . . . 75 open) and six pulses at a high value of the signal $b$ (gates 66, 67 . . . 70 open). After the foregoing it is not difficult to explain this diagram. It should be noted that the presence of two zero positions results in that the signal generator 4 operates in a slightly different manner from that described with reference to FIGURES 1 and 2 as long as the signal generator swings about its two zero points. FIG. 2$k$ is based on the supposition that the signal generator has only one zero position.

The invention is not restricted to the embodiments described above of the components. The pulses may, for example, be non-electrical; they may, for example, be pressure pulses of a gas or impacts of a rod. The various counting circuits may, if desired, be pawl-mechanism-driven mechanical counters or counters driven by series-connected magnets. As far as the signal generator 4 is concerned, it may, as an alternative, be designed as a member (for example a rod or wheel) capable of moving stepwise in one or in the other of two directions and supplying, when reaching an extreme position in one direction or in the other, an electrical or mechanical pulse, for example, by the transient closure of a contact or by the transient opening of a cock in a pressure duct. Then the member has to jump back into its initial position. Such a purely mechanical or electromechanical signal generator could be readily built up along known principles. However, if the occurring frequencies are comparatively high, which is the case in automatic telegraphy, an electronic design of the components will mostly give the optimum solution.

What is claimed is:

1. A system for generating a block signal having a given mean phase with respect to a pulsatory input signal, comprising a source of clock pulses having a repetition frequency that is a multiple of the mean repetition frequency of said input signal, block signal generator means for providing an output block signal having a repetition frequency that is a submultiple of the repetition frequency of said clock pulses, means connected to said source for passing a predetermined number of said clock pulses upon each occurrence of an input signal, said predetermined number being less than the total number of said clock pulses that occur in each period of said input signal, control circuit means for generating first and second correction signals, means for applying said correction signals to said block signal generator means for shifting the phase of said block signal in opposite directions, and means applying said predetermined number of clock pulses and said block signal to said control circuit means, said control circuit means having a plurality of positions and comprising means for stepping positions toward first and second extreme positions upon the occurrence of an input pulse when said block signal has a first and second state, respectively, means for generating said first and second correction signals upon the reaching of said first and second extreme positions, respectively, and means for reassuming an intermediate position upon reaching an extreme position.

2. A system for generating a block signal having a given mean phase with respect to a pulsatory input signal, comprising a source of clock pulses, a block signal generator, counting circuit means, and control signal generator means, said clock pulses having a repetition frequency that is a multiple of the mean repetition frequency of said input signal, means applying said clock pulses to said block signal generator, said block signal generator providing an output signal having a frequency that is a submultiple of the frequency of said clock pulses, said block signal generator having first and second control terminals, means applying said clock pulses and input signal to said counting circuit means, said counting circuit means having an output terminal, and being arranged to pass a predetermined number of said clock pulses to said output terminal at each occurrence of an input signal, said predetermined number being less than the total number of said clock pulses that occur in each period of said input signal, means connecting said output terminal to said control signal generator means, means applying the output signal of said block signal generator means to said control signal generator means, said output signals having first and second states, said control signal generator having first and second extreme positions, at least one central position, and a plurality of intermediate positions, said control signal generator comprising means for stepping one intermediate position toward said first extreme position upon the occurrence of an input pulse when said output signal has said first state, means for stepping one intermediate position toward said second extreme position upon the occurrence of an input pulse when said output signal has said second state, means for providing a first correction signal and reassuming to a central position when said first extreme position is reached, and means for providing a second correction signal and reassuming to a central position when said second extreme position is reached, means applying said first correction signal to said first control terminal to shift the phase of said output signal in one direction, and means applying said second correction signal to said second control terminal to shift the phase of said output signal in the opposite direction.

3. A system for generating a block signal having a given mean phase with respect to telegraph signals, said system comprising:

(*a*) a clock pulse generator for providing clock pulses having a repetition frequency that is a multiple of the pulse repetition frequency of said telegraph signals;

(*b*) a block signal generator connected to said clock pulse generator for dividing the frequency of said clock pulses to provide a block signal that has a repetition frequency equal to the mean repetition frequency of said telegraph signals;

(*c*) a counting circuit connected to said clock pulse generator for providing a predetermined number of counted pulses at the repetition frequency of said clock pulses at each occurrence of a telegraph signal, said predetermined number being less than the total number of clock pulses in each period of said telegraph signal;

(*d*) a control signal generator having first and second input terminal means, and first and second output terminal means, said control signal generator having first and second extreme positions, at least one central position, and a plurality of intermediate positions, and comprising means for stepping an intermediate position toward said first extreme position upon the occurrence of a signal at said first terminal means when the potential at said second terminal means has a first given value, means for stepping an intermediate position toward said second extreme position upon the occurrence of a signal at said first terminal when the potential at said second terminal means has a second given value, means for reassuming central position and applying a signal to said first output terminal means when said first extreme position is reached, and means for reassuming a central position and applying a signal to said second output terminal means when said second extreme position is reached;

(*e*) means for applying said counted pulses to said first input terminal means;

(*f*) means for applying said block signal to said second input terminal means; and (*g*) means for connecting said first and second output terminal means to said block signal generator, whereby the phase of said block signals is shifted in opposite directions in response to said signals applied to said first and second output terminals.

4. The system of claim 3, wherein said clock pulse generator comprises means for providing first and second clock pulse trains of the same repetition frequency, said first and second pulse trains having a mutual phase difference, means applying said first pulse train to said block signal generator, and means applying said second pulse train to said counting circuit.

5. The system of claim 3, wherein said clock pulse generator comprises means for providing first and second clock pulse trains of the same frequency and having a mutual phase difference, said block signal generator comprises a pulse gate and a counter, means applying said first and second clock pulse trains to said pulse gate, means for connecting said first and second output terminal means to said pulse gate whereby a pulse is added to the output of said pulse gate in response to a signal at said first output terminal means and a pulse is subtracted from the output of said pulse gate in response to a signal at said second output terminal means, and means applying the output of said pulse gate to said counter whereby an output block signal is produced by frequency division.

6. The system of claim 5, wherein said pulse gate comprises first, second and third gates each having an input terminal, an output terminal, and a control terminal, a first flip-flop circuit having a pair of input terminals and a pair of output terminals, means applying said first pulse train to the input terminals of said first and second gates, means applying said second pulse train to the input terminal of said third gate, means connecting the output terminals of said first flip-flop to separate control terminals of said first and second gates, means connecting said first output terminal means to one input terminal of said first flip-flop, means connecting the output of said second gate to the other input terminal of said first flip-flop, a second flip-flop having a pair of input terminals and a single output terminal, means connecting said second output terminal means of said control signal generator to one input terminal of said second flip-flop, means connecting the output terminal of said third gate to the other input terminal of said second flip-flop, means connecting said single output terminal to the control terminal of said third gate, and means connected to the output terminals of said first and third gates for providing an output signal of said pulse gate.

7. The system of claim 5, for producing a pulse in the center of said block signal, wherein said counter comprises a plurality of cascaded flip-flop circuits, means applying the output of said pulse gate to the first flip-flop of said cascaded flip-flops, the next to the last flip-flop having two outputs of opposite polarity, means for applying one of said outputs to the input of the last flip-flop, said last flip-flop having a pair of output terminals for providing block signals of opposite polarity, a gate circuit having a control terminal, an input terminal and an output terminal, means applying the other of said outputs to said input terminal of said gate, means connecting one of the output terminals of said last flip-flop to the control terminal of said gate, and means connected to the output terminal of said gate for providing said pulse in the center of said block signal.

8. The system of claim 3, in which said counting circuit comprises a gate having an input terminal, a control terminal, and an output terminal, a circulating shift register having an input terminal connected to the output terminal of said gate, and an output terminal, a flip-flop having a first input terminal connected to the output of said register and a second input terminal, means applying said telegraph signal to said second input terminal, said flip-flop having an output terminal connected to said control terminal of said gate, and means for deriving said counted pulses from the output of said gate.

9. The system of claim 3, in which said control signal generator comprises a plurality of flip-flops having one input terminal and a pair of output terminals, a plurality of gates having input terminals, output terminals, and control terminals, means connecting said flip-flops in cascade with each output terminal of said flip-flops being connected to the input terminal of the next flip-flop by way of the input and output terminals of a separate gate, whereby a pair of gates occur between adjacent flip-flops, means providing first and second block signals of opposite polarity, means applying said counted pulses to the input of said first flip-flop, means applying said first block signal to one gate between each pair of adjacent flip-flops and for applying said second block signal to the other gate between each pair of adjacent flip-flops, whereby said flip-flops count in one direction when said block signals have one value and in the opposite direction when said block signals have another value, and means connecting the output terminals of the last flip-flop to separate terminals of said first and second output terminal means.

10. The system of claim 3, in which said means connecting the output terminals of said last flip-flop to said output terminal means comprises first and second gates having input, output and first and second control terminals, said output terminals of said last flip-flop being connected to the respective output terminal means by way of the input and output terminals of a separate gate, means applying said first and second block signals to the first control terminals of separate gates, third and fourth gates having input, output and control terminals, a control flip-flop having a pair of input terminals and a pair of output terminals, means connecting the output terminals of said last flip-flop to separate input terminals of said control flip-flop by way of the input and output terminals of said third and fourth gates, means applying said first and second block signals to separate control terminals of said third and fourth gates, and means connecting the output terminals to separate second control terminals of said first and second gates.

References Cited in the file of this patent

UNITED STATES PATENTS 2,934,604 Bizet ------------------ Apr. 26, 1960